(12) United States Patent  
Robinson

(10) Patent No.: US 8,462,397 B2  
(45) Date of Patent: Jun. 11, 2013

(54) SCANNER CARRIER APPARATUS

(75) Inventor: Peter Robinson, Essex (GB)

(73) Assignee: Neopost Technologies, Bagneux (FR)

( * ) Notice: Subject to any disclaimer, the term of this patent is extended or adjusted under 35 U.S.C. 154(b) by 361 days.

(21) Appl. No.: 12/795,094

(22) Filed: Jun. 7, 2010

(65) Prior Publication Data  
US 2010/0309531 A1 Dec. 9, 2010

(30) Foreign Application Priority Data

Jun. 9, 2009 (GB) .................................. 0909931.8

(51) Int. Cl.  
*H04N 1/04* (2006.01)

(52) U.S. Cl.  
USPC ............................. 358/474; 358/497; 358/473

(58) Field of Classification Search  
USPC .......................... 358/474, 483, 496, 486, 501  
See application file for complete search history.

(56) References Cited

U.S. PATENT DOCUMENTS

| | | | | |
|---|---|---|---|---|
| 4,764,815 A | * | 8/1988 | Landsman | 358/496 |
| 5,012,349 A | * | 4/1991 | de Fay | 358/296 |
| 5,171,980 A | * | 12/1992 | Marzullo et al. | 250/223 R |
| 5,523,848 A | * | 6/1996 | Musso et al. | 358/296 |
| 6,005,681 A | * | 12/1999 | Pollard | 358/473 |
| 6,167,232 A | * | 12/2000 | Jimenez et al. | 399/367 |
| 6,450,610 B1 | * | 9/2002 | Shimura | 347/37 |
| 6,471,202 B1 | * | 10/2002 | Sugimura | 271/10.11 |
| 6,531,695 B2 | * | 3/2003 | Fukazawa et al. | 250/239 |
| 7,042,597 B2 | * | 5/2006 | Wada | 358/472 |
| 2002/0054376 A1 | * | 5/2002 | Wada | 358/472 |
| 2009/0177312 A1 | | 7/2009 | Audeon | |

FOREIGN PATENT DOCUMENTS

| | | |
|---|---|---|
| GB | 2258332 A | 2/1993 |
| GB | 2282476 A | 4/1995 |

\* cited by examiner

*Primary Examiner* — Negussie Worku  
(74) *Attorney, Agent, or Firm* — Sughrue Mion, PLLC

(57) ABSTRACT

Apparatus for supporting a scanner head, the apparatus comprising: a carrier assembly; a bogey assembly; and a scanner head assembly, comprising a mounting for holding a scanner head; wherein the scanner head assembly and the bogey assembly are both mounted on spring bearings on the carrier assembly such that they can both move in a vertical direction, and the scanner head assembly comprises at least two collinear vertical bearings which restrict movement of the scanner head assembly to vertical movement substantially perpendicular to a document path, and the bogey assembly comprises two laterally spaced bearings which allow rotational movement of the bogey assembly about the scanner head mounting.

10 Claims, 6 Drawing Sheets

SCANNER CARRIER APPARATUS

The present invention relates to apparatus for supporting a scanner in a paper handling system, for example in an inserter system used for inserting sheets of paper into an envelope for mailing.

Scanners are typically arranged to read machine control data printed on sheets entering the paper handling system and suitable scanners may be bar code scanners, OCR readers, magnetic readers, cameras or any other reading devices. The control data thus read may provide information and instructions relevant to control of the flow of paper and the operation of the apparatus in dependence upon the control codes printed on the documents.

If scanners are rigidly mounted to the paper handling apparatus then their position must be manually adjusted at the beginning of a production run to accommodate different thicknesses, weights and sizes of paper, and to accommodate different positions of the control codes on the documents. It may also be necessary to adjust the distance of the scanner head face from the document to ensure correct focussing on the codes. Such manual adjustment is time consuming and subject to human error. The need for manual adjustment makes known optical scanner assemblies unsuitable for small scale use and particularly for use with a variety of different document types.

There is therefore a need for an automatically adjustable scanner apparatus.

U.S. Pat. No. 5,171,980 describes an optical scanner apparatus for an inserter, comprising a support member rigidly fixed over a paper path in an inserter, and a mounting structure for a scanner head. The mounting structure is operatively coupled to the support member to allow position adjustments of the scanner in the transverse direction. A fixed reference for vertical movement is provided by linkage, and paper guides assist to maintain a fixed distance between the scanner head and document being scanned. The apparatus keeps the scanner head parallel to the paper path and a fixed distance from the document during scanning. However this apparatus is bulky and less reliable and efficient than is desired.

According to the present invention there is provided apparatus for supporting a scanner head, the apparatus comprising: a carrier assembly; a bogey assembly; and a scanner head assembly, wherein the scanner head assembly and the bogey assembly are both mounted on spring bearings on the carrier assembly such that they can both move in a vertical direction, and the scanner head assembly comprises two collinear vertical bearings which restrict movement of the scanner head assembly to vertical movement substantially perpendicular to a document path, and the bogey assembly comprises two laterally spaced independent bearings to allow rotational movement of the bogey assembly about the scanner head.

Preferably the laterally spaced bearings are housed within cut-outs on the carrier assembly and the laterally spaced bearing points are disposed on opposed sides of the scanner head along the document path.

According to one embodiment the bogey assembly comprises at least two rollers laterally spaced on opposed sides of the scanner head along the document path.

The bogey assembly may also comprise a lead roller at the input side of the document path which provides a clearance for passage of a document which clearance is larger than that provided by the first roller.

The carrier assembly may comprise a first spring housing for a spring to provide a bias between the carrier assembly and the scanner head assembly toward the document path, and a second spring housing for a spring which provides a bias between the carrier assembly and the bogey assembly. Preferably there on each side of the scanner head.

There may also be an upper abutment between the scanner head assembly and the bogey assembly, vertically spaced from the laterally spaced bearing points and on the downstream side of the document path.

Advantageously a guide tape is positioned so as to deflect a document travelling along the document path to contact the scanning face of the scanning head. Preferably a second scanner head is positioned below the document path and a second guide tape may be positioned so as to deflect a document travelling along the document path into contact with the second scanning head.

For a better understanding of the present invention, and to show how the same may be carried into effect, reference will now be made, by way of example, to the accompanying drawings, in which.

Figure 1:
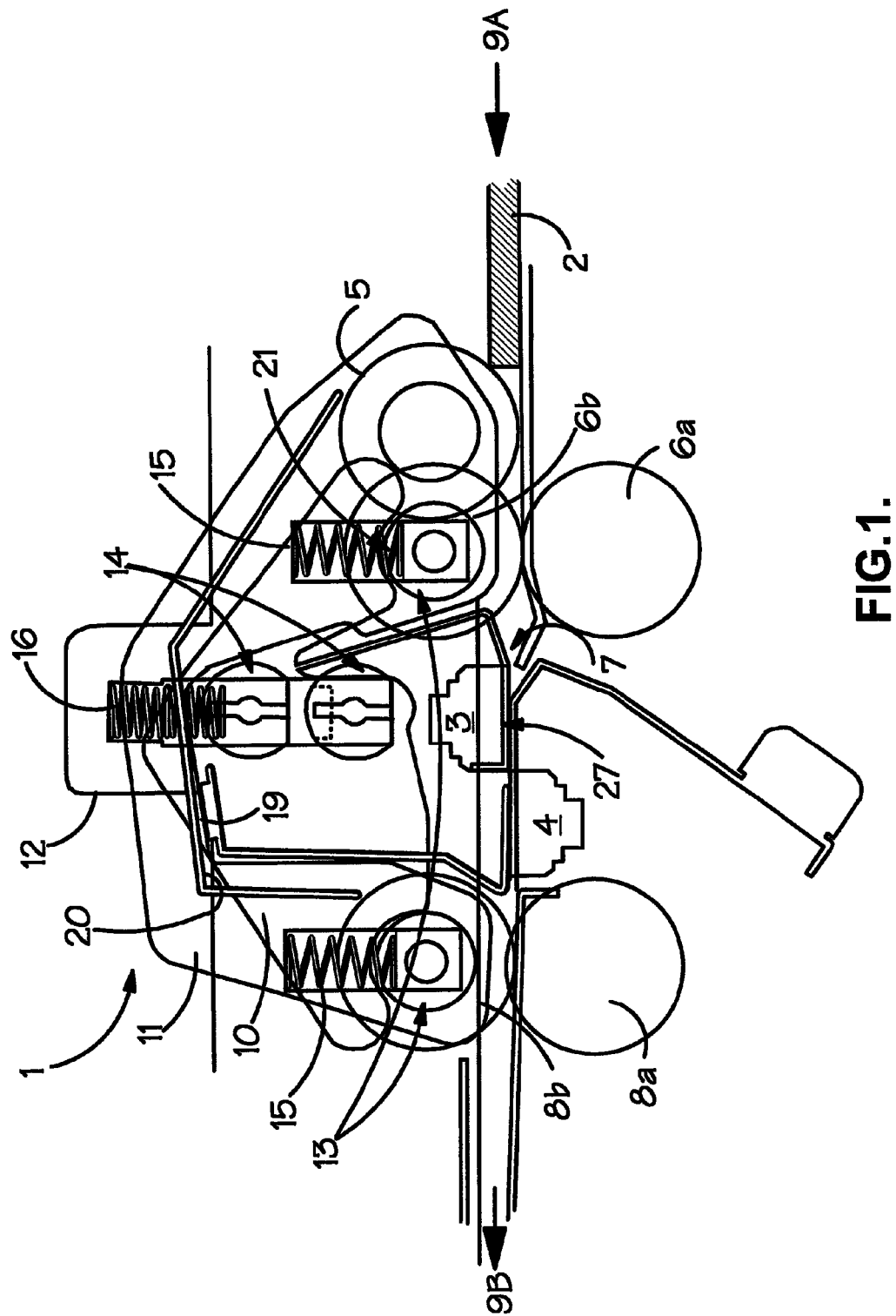
FIG. 1 is a cross sectional view of the apparatus according to the invention.

FIG. 1 shows the scanner carrier apparatus indicated generally at 1, in cross-section. A document 2 enters the apparatus 1 from the right-hand side and travels from right to left along a document path as indicated generally between arrows 9A and 9B, passing an upper scanner 3 and a lower scanner 4 which read optical marks or indices on respective sides of the document 2.

A first, lead, roller 5 contacts the document 2 initially at the input to the apparatus and moves it further into the apparatus to engage with a second set of rollers 6. The second roller set 6 guides the document 2 into a document channel 7 so that it passes the scanners 3 and 4. Finally the document enters the nip of a third set of rollers 8 which drives it out of the apparatus in the direction of arrow 9B.

The apparatus 1 comprises three interconnected but relatively moveable parts which will be referred to as a scanner head assembly 10, a bogey assembly 11 and a carrier assembly 12. These three parts are shown more clearly in the exploded view of FIG. 3, parts of which will also be referred to here.

The head assembly 10 has a scanner mounting on its lower side to which a scanner 3 is fixed. It is in close proximity to two laterally spaced rotational bearings 13 in the bogey assembly 11. It is also attached to the carrier assembly 12 by two vertically spaced bearings 14 which constrain the head assembly 10 to vertical movement only. In this way the scanner 3 always has its lower scanning face held at the same angle to the document travelling through the apparatus, regardless of the height of the head assembly above the document path, and hence regardless of the thickness of the document 2.

Each of the bearings 13 on the bogey assembly 11 is connected by a spring 15 to the carrier assembly 12. The head assembly 10 is connected to the carrier assembly 12 by a spring 16. Hence the bogey assembly 11 and the head assembly 10, with the scanner 3, are biased in a downward direction (as shown in the figures) toward the face of the document 2. However the bearings 13 on the bogey assembly 11 do not contact the head assembly 10 in the normal steady state condition because there is a clearance gap 21 (FIGS. 1 and 2) between surfaces 24 of bearings 13 and surfaces 25 of head assembly 10. There is an equal sized clearance between an abutment plate 19 on the head assembly 10 and a downward facing surface 20 on the bogey assembly 11.

As the document 2 travels along the document path 9A-9B it contacts each in turn of the three roller sets 5, 6 and 8. The bogey assembly 11 is lifted by a distance dependent on the thickness of the document 2, against the force of the springs 15, and will rock about bearings 13 depending on where the document is in the path and its thickness. If the document 2 is thicker than the clearance gap 21 then the upper surfaces 24 on the bearings 13 contact the lower surfaces 25 on arms 18a and 18b of head assembly 10. In addition abutment plate 19 contacts surface 20.

As the bogey assembly 11 lifts, and/or rotates on one or both of bearings 13, it also causes the head assembly 10 to rise in bearings 14 against the force of the spring 16. However the head assembly 10 is constrained by the linear arrangement of bearings 14 to substantially vertical translational movement. Hence the scanning face of the scanner 3 is kept parallel to the document to be read.

Figure 2:
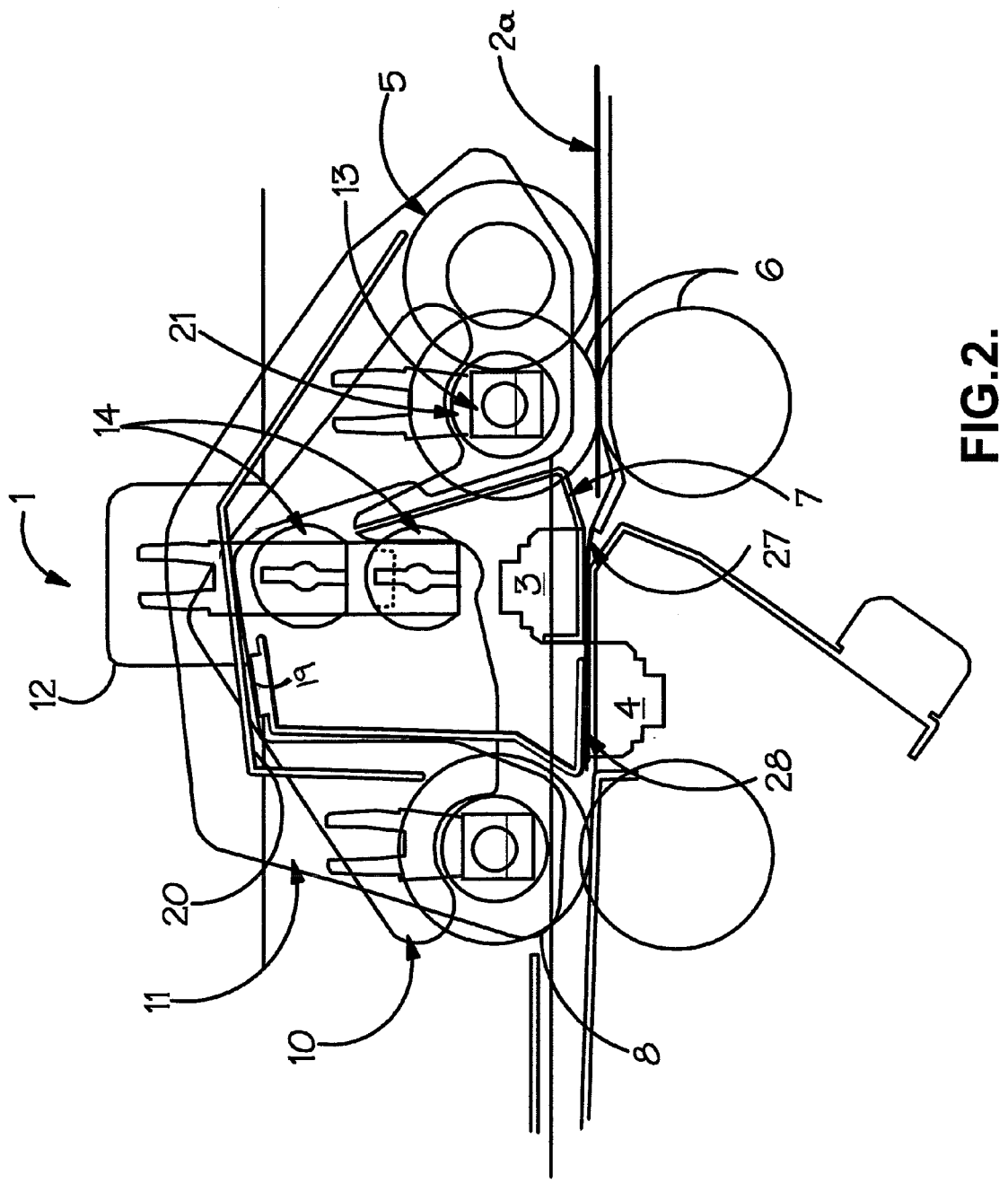
FIG. 2 is a cross sectional view of the apparatus of FIG. 1 with springs omitted for ease of view.

FIG. 2 shows the apparatus of FIG. 1 but the springs 15 and 16 are omitted for ease of reference, and the document 2a in this example is much thinner than that in FIG. 1. This thin document 2a will not displace either the bogey assembly 11 or the head assembly 10 because bearings 13 do not contact head assembly 10 at point 24/25 for thinner documents. It can be seen in this example that the document 2a does not contact the input roller 5 because of the large clearance distance.

Figure 3:
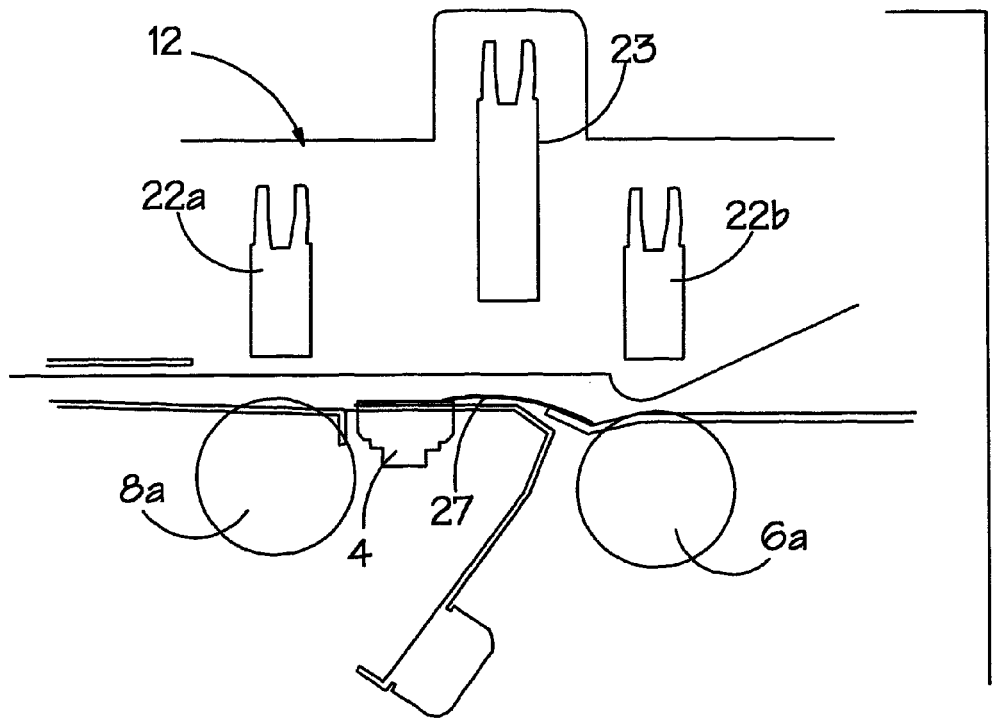
FIG. 3 is an exploded view of the apparatus of FIG. 1 showing three constituent parts.
Figure 3:
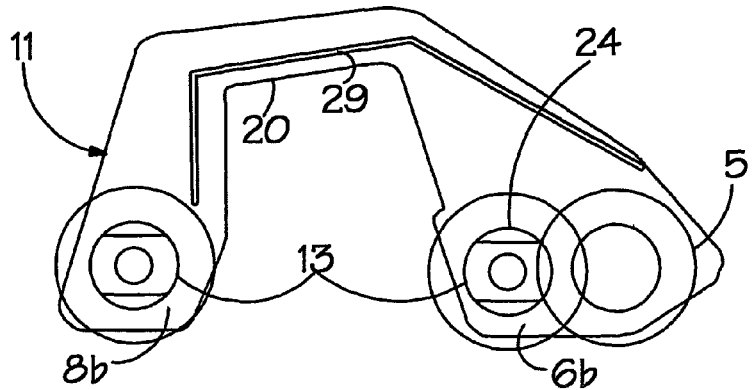
Figure 3:
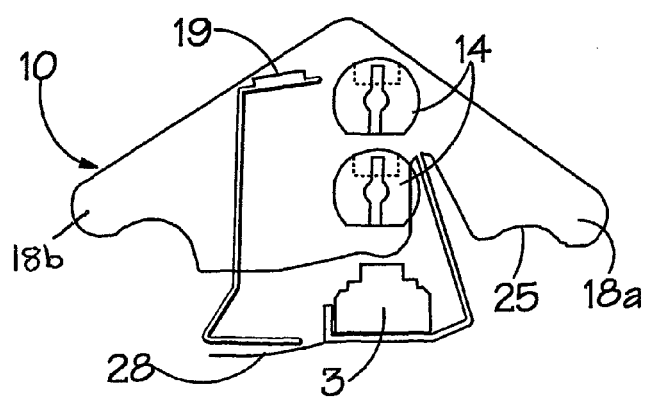

The individual constituent assemblies 10, 11 and 12 are most clearly seen in FIG. 3 and each will now be described in more detail. The head assembly 10 is shown at the bottom of the figure, the bogey assembly 11 in the middle and the carrier assembly 12 at the top. The lower scanner 4 is mounted to a chassis also housing the carrier assembly 12. The lower rollers 6a and 8a of the second and third sets of rollers 6, 8 are also mounted to the chassis housing the carrier assembly 12 whilst the upper rollers 6b and 8b of the respective sets are mounted to the bogey assembly 11.

The head assembly 10 is a generally triangular shape and comprises two laterally extending arms 18a and 18b with concave curved undersides 25. In the steady state, when no document is in the apparatus 1, these curved surfaces sit a small distance 21 from the upper convex surfaces 24 of the bearings 13. This clearance distance 21 is set by abutment of the lower one of bearings 14 sitting on the lower edge of slot 23 on the carrier assembly 12.

The bogey assembly 11 is a generally inverted U shape forming an arch 29 with bearings 13 mounted toward the end of each arm coaxial with respective upper rollers 6b and 8b. The first roller 5 is mounted upstream of the second roller 6b. Contact surface 20 for abutment plate 19 is on the upper side of the arch 29.

The carriage assembly 12 sits within a chassis, which comprises the corresponding lower rollers 6a and 8a, and the lower surface scanner 4. The carriage assembly 12 comprises spring mounts 22a, 22b and 23. Mounts 22a and 22b are adapted to retain the springs 15 which act on the bearings 13, and mount 23 is adapted to hold the spring 16 which acts on the upper bearing 14.

FIGS. 4 to 9 illustrate a sequence in the operation of the apparatus 1 of FIG. 1.

Figure 4:
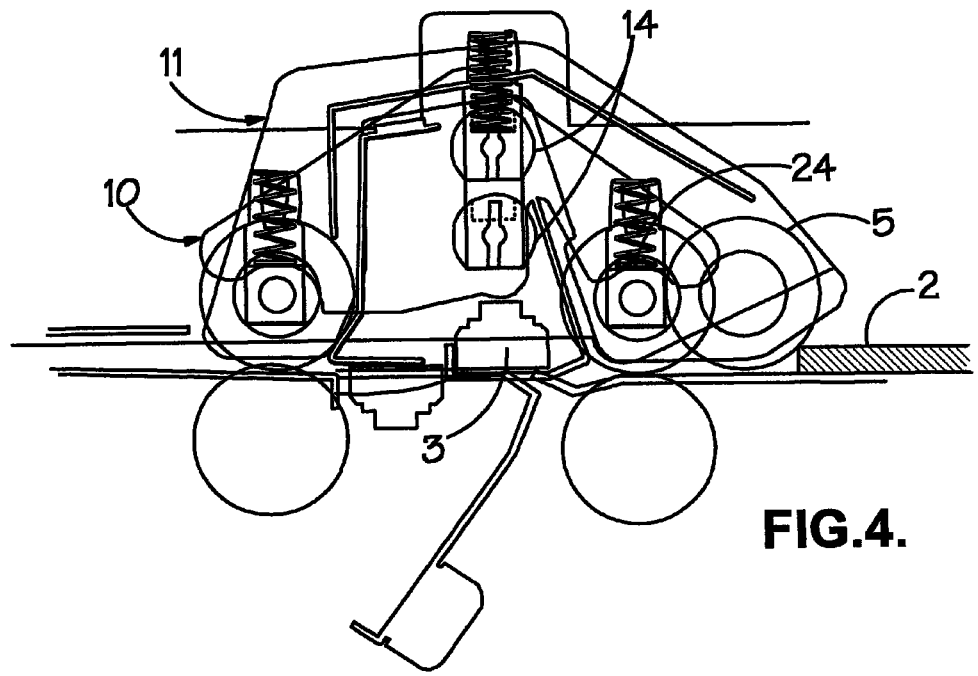
FIGS. 4 to 9 are a sequence of illustrations showing the operation of the apparatus of FIG. 1.

In FIG. 4 the incoming document 2 is in contact with the first roller 5. The roller 5 is part of the moveable bogey assembly 11. Contact point 24 on bogey assembly 11 makes contact with head assembly 10 at contact point 25. In this example a relatively thick document 2 is being used and this causes the roller 5 to lift. This lifts the right-hand side of the bogey assembly 11 rotating it about the left-hand bearing 13. In turn this moves the head assembly 10 upwards. However the scanner head 3 maintains a parallel face to the upper surface of document 2 because of vertical bearings 14.

Figure 5:
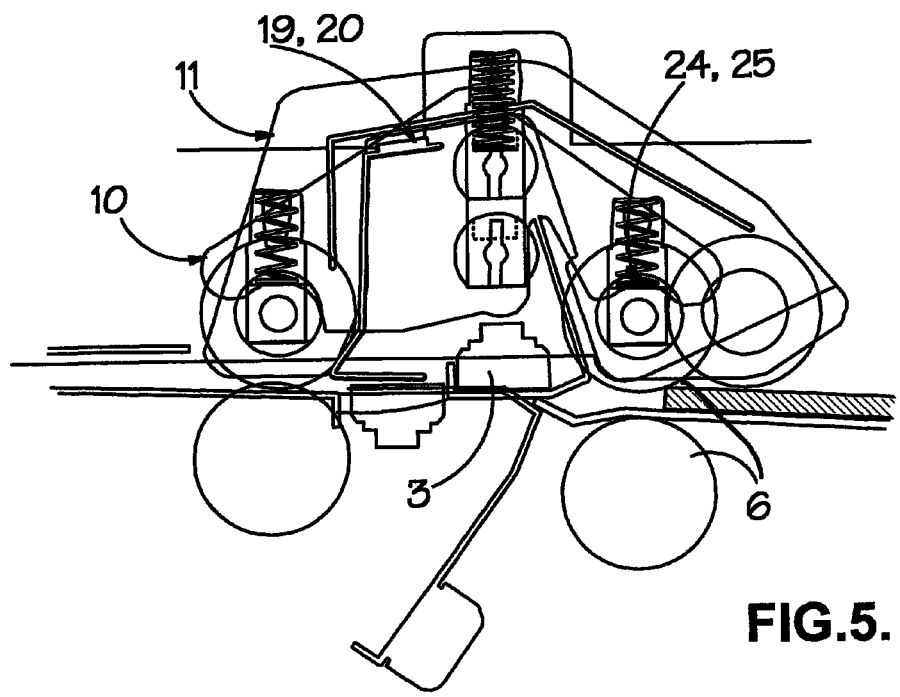

In FIG. 5 the document 2 progresses towards the scanner head 3 and contacts the second set of rollers 6. Due to the thickness of the document 2 the bogey assembly 11 rotates further in an anti-clockwise direction and the head assembly 10 is pushed further upwards through contact between point 24 on the bogey assembly 11 and 25 on the head assembly 10, as well as contact between points 19 on the head assembly 10 and 20 on the bogey assembly 11.

Figure 6:
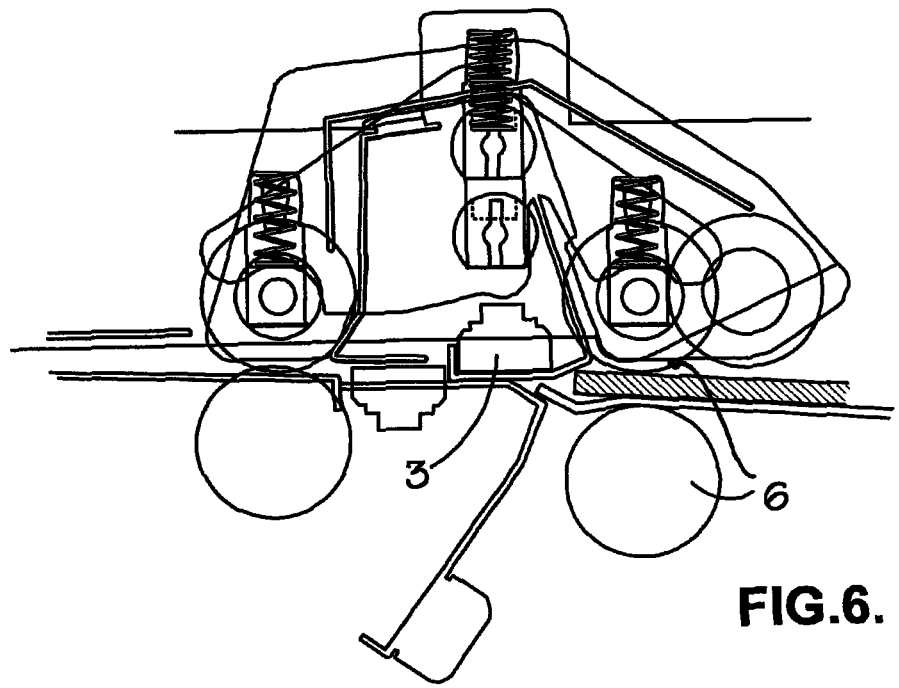

In FIG. 6 the document 2 is fully engaged by the rollers 6 and the head assembly 10 has moved automatically upwards into the appropriate position for the scanner head 3 to read the document 2.

Figure 7:
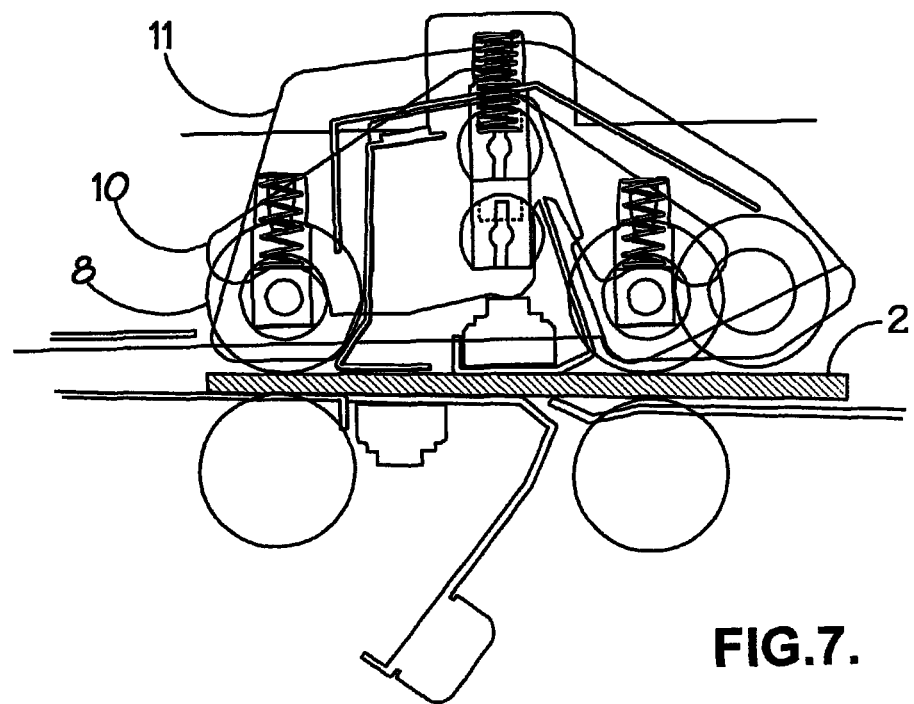

In FIG. 7 the document 2 has progressed through the apparatus and its leading edge is now between rollers 8. This rotates the bogey assembly 11 in a clockwise direction and bogey assembly 11 and head assembly 10 are now in their uppermost reading position.

Figure 8:
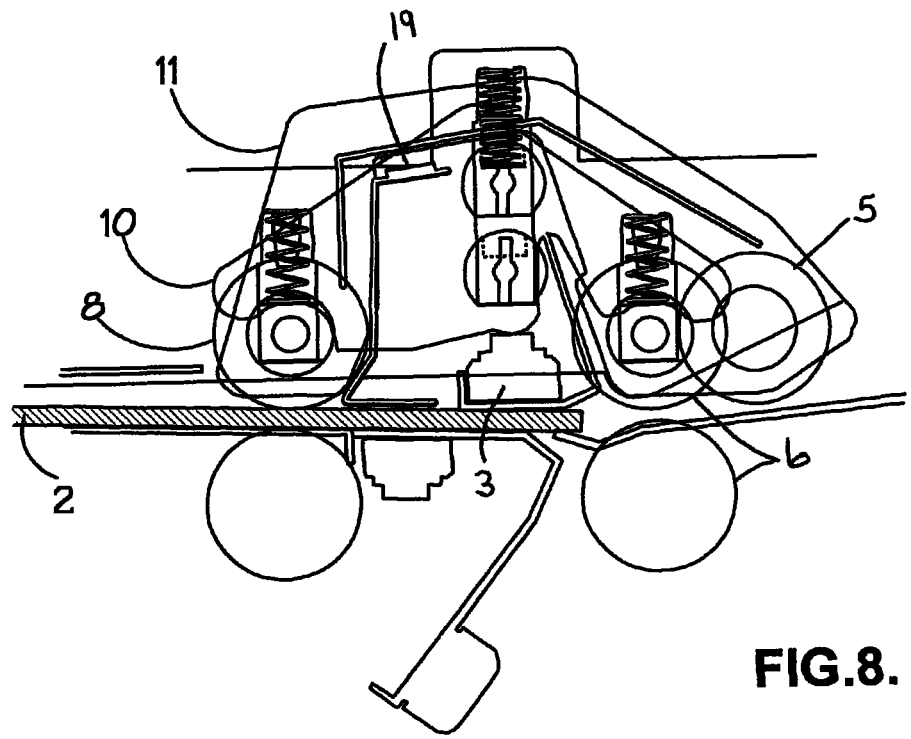

In FIG. 8 the document 2 starts to clear the scanner head 3 which allows roller 6 to begin moving down to return to its lower start position. The roller 8 is still held higher via contact between points 19 and 20.

Figure 9:
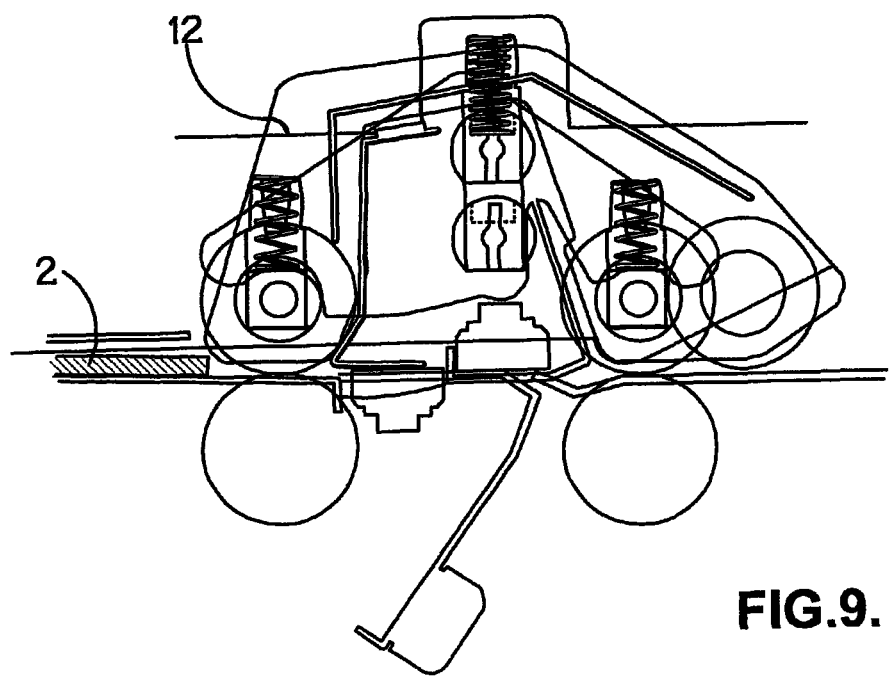

In FIG. 9 the document 2 is now clear of the scanner head 3 and exit rollers 8 and the bogey assembly 11 has moved back down to its starting position and is now free to start the sequence again.

The input roller 5 is set to provide a predetermined clearance gap (typically 2.5 mm) between its outer circumference and the input platform but the rollers 6 and 8 are set without a clearance distance. Hence when the document 2 to be read is thin, as shown in FIG. 2, it will pass under the input roller 5 and the bogey assembly 11 will not move upwardly until the document reaches the second set of rollers 6. A clearance distance of typically 1 mm is provided between the contact points 24 and 25 and between surfaces 19 and 20 so that if the document 2 is less than 1 mm thick the bogey assembly 11 will move upwardly but will not contact the head assembly and will not move the head assembly upwards. For such thin documents resilient guide tapes 27, 28 are provided to ensure that the scanner head 3 contacts the document 2. The guide tape 27 for the upper scanner head 3 is mounted on the chassis which also houses the carrier assembly 12, and the guide tape 28 for the lower scanner head 4 forms part of the head assembly 10. When the document 2 makes contact with one of the guide tapes 27, 28 the natural bias of the tape cause the document 2 to be deflected towards and make contact with the respective scanner head 3, 4. The guide tapes 27, 28 also act to bias thicker documents towards the respective scanner head, albeit only slightly. Such a guide tape may typically be pre-formed from polyester material but any resilient flat spring would be suitable.

Hence the guide tapes 27 and 28 perform the function of making the document 2 contact the scanner heads 3 and 4 whereas the floating nature of the head and bogey assemblies 10 and 11 allow thicker documents to pass through the reading section whilst keeping the upper scanner head 3 parallel to the document 2.

This arrangement has been found to work well with a wide variety of documents of various thicknesses, and acts to keep the document in contact with the scanner heads, yet retains the necessary parallel orientation of the scanner heads with respect to the surface of the document being scanned.

The invention claimed is:

1. Apparatus for supporting a scanner head, the apparatus comprising:
   a carrier assembly;
   a bogey assembly; and
   a scanner head assembly, comprising a scanner head mounting for holding a scanner head;
   wherein said scanner head assembly and said bogey assembly are both mounted on spring bearings on said carrier assembly such that they can both move in a vertical direction, and
   said scanner head assembly comprises at least two collinear vertical bearings which restrict movement of said scanner head assembly to vertical movement substantially perpendicular to a document path, and
   said bogey assembly comprises two laterally spaced bearings which allow rotational movement of said bogey assembly about said scanner head mounting.

2. Apparatus according to claim 1 wherein said laterally spaced bearings are housed within cut-outs on said carrier assembly and said two laterally spaced bearing points are disposed on opposite sides of said scanner head along said document path.

3. Apparatus according to claim 1 wherein said bogey assembly comprises at least two sets of rollers laterally spaced on opposite sides of said scanner head along said document path.

4. Apparatus according to claim 3 wherein said bogey assembly comprises a lead roller at an input side of said document path which is positioned to provide a predetermined clearance from an input conveyor.

5. Apparatus according to claim 3 comprising an upper abutment between said scanner head assembly and said bogey assembly, vertically spaced from the first contact points.

6. Apparatus according to claim 1 wherein said carrier assembly comprises a spring housing for a spring which provides a bias between said carrier assembly and said scanner head assembly toward said document path.

7. Apparatus according to claim 1 wherein said carrier assembly comprises a spring housing for a spring which provides a bias between said carrier assembly and said bogey assembly on each side of said scanner head.

8. Apparatus according to claim 1 further comprising a second scanner head positioned below said document path.

9. Apparatus according to claim 1 further comprising at least one resilient flat guide spring positioned so as to deflect a document travelling along said document path to contact a scanning face of said scanning head.

10. Apparatus according to claim 9 further comprising a second resilient flat guide spring, positioned so as to deflect a document travelling along said document path into contact with a second scanning head located below said document path.

* * * * *